United States Patent
Ito et al.

(10) Patent No.: US 8,454,930 B2
(45) Date of Patent: Jun. 4, 2013

(54) MAYENITE-TYPE COMPOUND AND PROCESS FOR PRODUCTION OF SAME

(75) Inventors: Kazuhiro Ito, Tokyo (JP); Satoru Watanabe, Tokyo (JP); Naomichi Miyakawa, Tokyo (JP); Setsuro Ito, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 40 days.

(21) Appl. No.: 13/034,765

(22) Filed: Feb. 25, 2011

(65) Prior Publication Data

US 2011/0155970 A1 Jun. 30, 2011

Related U.S. Application Data

(63) Continuation of application No. PCT/JP2009/064673, filed on Aug. 21, 2009.

(30) Foreign Application Priority Data

Aug. 27, 2008 (JP) ................................. 2008-218199

(51) Int. Cl.
*C01G 3/00* (2006.01)

(52) U.S. Cl.
USPC ............ 423/600; 423/111; 423/265; 423/275

(58) Field of Classification Search
USPC .............. 423/600, 265, 275, 111; 252/518.1, 252/519.4, 521.5; 429/218.1
See application file for complete search history.

(56) References Cited

U.S. PATENT DOCUMENTS

| | | | | |
|---|---|---|---|---|
| 7,465,433 | B2 * | 12/2008 | Hosono et al. | 423/600 |
| 7,507,289 | B2 * | 3/2009 | Hosono et al. | 117/4 |
| 7,670,585 | B2 * | 3/2010 | Hosono et al. | 423/600 |
| 2005/0279279 | A1 * | 12/2005 | Hosono et al. | 117/68 |
| 2006/0276326 | A1 * | 12/2006 | Hosono et al. | 501/153 |

FOREIGN PATENT DOCUMENTS

| | | |
|---|---|---|
| JP | 2008-047434 | 2/2008 |
| JP | 2009-203126 | 9/2009 |
| WO | 03/089373 | 10/2003 |
| WO | 2005/000741 | 1/2005 |
| WO | 2005/077859 | 8/2005 |
| WO | 2008/087774 | 7/2008 |

OTHER PUBLICATIONS

Translation of Japan 2008-047434, Feb. 28, 2008.*
Translation of Japan 2009-203126, Sep. 10, 2009.*
U.S. Appl. No. 13/080,769, filed Apr. 6, 2011, Ito et al.
S. Webster et al., International Display Workshop 2007, PDP. pp. 795-798.
F. M. Lea et al., The Chemistry of Cement and Concrete 2$^{nd}$ ed., pp. 51-55.
International Search Report issud Oct. 13, 2009 in PCT/JP09/064673 filed Oct. 5, 2009.
U.S. Appl. No. 13/192,568, filed Jul. 28, 2011, Ito et al.

* cited by examiner

*Primary Examiner* — Steven Bos
(74) *Attorney, Agent, or Firm* — Oblon, Spivak, McClelland, Maier & Neustadt, L.L.P.

(57) ABSTRACT

The present invention relates to a mayenite-type compound in which a part of Ca of a mayenite-type compound containing Ca, Al and oxygen is substituted by at least one kind of an atom M selected from the group consisting of Be, Mg and Sr, in which the mayenite-type compound has an atom number ratio represented by M/(Ca+M) of from 0.01 to 0.50, and at least a part of free oxygen ions in a mayenite-type crystal structure are substituted by anions of an atom having electron affinity smaller than that of an oxygen atom.

12 Claims, No Drawings

MAYENITE-TYPE COMPOUND AND PROCESS FOR PRODUCTION OF SAME

TECHNICAL FIELD

The present invention relates to a mayenite-type compound and a process for producing the same. More particularly, the invention relates to a mayenite-type compound improved in oxidation resistance and a process for producing the same at high productivity.

BACKGROUND ART

A mayenite-type compound is a $12CaO.7Al_2O_3$ (hereinafter also referred to as "C 12A7") crystal and a compound of the same type having a crystal structure equivalent to that of the C12A7 crystal, and has three-dimensionally linked voids (cages) having a diameter of about 0.4 nm. A framework constituting the cages carries a positive electric charge and forms 12 cages per unit lattice. One sixth of the cages are occupied by oxygen ions in order to satisfy an electrically neutral condition of the crystal, and these oxygen ions are particularly called "free oxygen ions" because they have properties chemically different from those of the other oxygen ions constituting the framework. Accordingly, the C12A7 crystal is also denoted as $[Ca_{24}Al_{28}O_{64}]^{4+}.2O^{2-}$ (Non-Patent Document 1).

Further, when the above-mentioned free oxygen ions are substituted by electrons, a mayenite-type compound having electrical conductivity is obtained. In Patent Document 1, it is described that when a C12A7 crystal is subjected to a reduction treatment by using alkali earth metal vapor, the free oxygen ions in the cages are substituted by electrons to be able to prepare a mayenite-type compound which is the C12A7 crystal and has electrical conductivity (hereinafter also referred to as a "C12A7 electride").

Such a C12A7 electride has characteristics such as excellent sputtering resistance and secondary electron emission coefficient, so that the C12A7 electride has been considered to be preferably available, for example, as a material for a plasma display panel (hereinafter also referred to as a "PDP").

However, in the C12A7 electride, the electrons in the cages rapidly diffuse and are immediately substituted by the oxygen ions. For this reason, the C12A7 electride is difficult to be stored in air for a long period of time. Further, heat treatment at the time when used in the PDP and the like decreases the electron concentration in the C12A7 electride, resulting in deterioration of characteristics such as the secondary electron emission coefficient.

Accordingly, there has been required a mayenite-type compound in which the deterioration of characteristics as described above is decreased even when heat treated at about 250 to 500° C., and which are excellent in thermal stability and oxidation resistance.

Then, Non-Patent Document 2 has proposed a method of replacing a part of free oxygen ions in a C12A7 crystal by electrons and hydride ions (H−), thereby improving oxidation resistance.

BACKGROUND ART DOCUMENT

Patent Documents

Patent Document 1: PCT International Publication No. 2005/000741 Pamphlet Non-Patent Documents Non-Patent Document 1: F. M. Lea and C. H. Desch, The Chemistry of Cement and Concrete, 2nd ed., p. 52, Edward Arnold & Co., London, 1956.
Non-Patent Document 2: S. Webster, M. Ono, S. Ito, H. Kajiyama, T. Shinoda and H. Hosono, International Display Workshop, PDP, p. 1-4, 2007

SUMMARY OF THE INVENTION

Problems that the Invention is to Solve

As described above, the C12A7 electride is liable to be oxidized in air, and easily oxidized particularly at the time of heat treatment, resulting in a decrease in electron concentration in the C12A7 electride. Accordingly, there has been a problem, for example, that characteristics such as the secondary electron emission coefficient to Ne or Xe gas encapsulated in a PDP deteriorate. For this reason, it has been difficult to apply the C12A7 electride to a device such as the PDP accompanied by heat treatment.

An object of the invention is to provide a mayenite-type compound which is chemically stable and excellent in oxidation resistance, and in which specific anions are not decreased easily even when heat treatment is conducted in air and electrons generated by irradiating the specific anions with an ultraviolet ray are also not decreased easily. Further, a process for producing such a mayenite-type compound at high productivity can be provided.

Means for Solving the Problems

The present inventors have made intensive studies. As a result, it has been found that a mayenite-type compound in which Ca atoms in a conventional mayenite-type compound are substituted by other atoms in a specific amount and free oxygen ions are substituted by specific anions can solve the above-mentioned problem, thus completing the invention.

Namely, the present invention relates to the following items (1) to (12).
(1) A mayenite-type compound in which a part of Ca of a mayenite-type compound containing Ca, Al and oxygen is substituted by at least one kind of an atom M selected from the group consisting of Be, Mg and Sr,
wherein the mayenite-type compound has an atom number ratio represented by M/(Ca+M) of from 0.01 to 0.50, and at least a part of free oxygen ions in a mayenite-type crystal structure are substituted by anions of an atom having electron affinity smaller than that of an oxygen atom.
(2) The mayenite-type compound according to (1), wherein a composition before the free oxygen ions are substituted by the anions is represented by $(Ca_{1-X}M_X)_{12}Al_{14}O_{33}$ (X is from 0.01 to 0.50).
(3) The mayenite-type compound according to (1) or (2), wherein the anion is at least one selected from the group consisting of $H^-$, $H^{2-}$, $F^-$, $Cl^-$, $Br^-$, $I^-$, $S^{2-}$ and $Au^-$.
(4) The mayenite-type compound according to any one of (1) to (3), wherein the atom M is Mg.
(5) The mayenite-type compound according to any one of (1) to (4), wherein the mayenite-type compound has an electron concentration of $1.0 \times 10^{17}/cm^3$ or more after irradiated with an ultraviolet ray of 330 nm.
(6) A process for producing a mayenite-type compound, the process comprising:
a calcination step comprising mixing a calcium compound, an M-containing compound and an aluminum compound in such a manner that a molar ratio in terms of CaO, MO (M is at least one selected from the group consisting of Be, Mg and Sr) and $Al_2O_3$ becomes substantially $CaO:MO:Al_2O_3=12(1-Y):12Y:7$ (Y is from 0.01 to 0.90), and firing the resulting mixture at 900 to 1,300° C. in air, followed by pulverizing to obtain a calcined powder;

a reduction step comprising subjecting the calcined powder to a reducing treatment at a temperature of 850° C. to less than 1,415° C. to obtain a reduced product having a mayenite-type structure, in which at least a part of free oxygen ions of the calcined powder are substituted by electrons; and a substitution step comprising treating the reduced product at 400 to 1,200° C. in an atmosphere containing an atom having electron affinity smaller than that of an oxygen atom.

(7) A mayenite-type compound in which a part of Ca of a mayenite compound containing Ca, Al and oxygen is substituted by at least one kind of an atom M selected from the group consisting of Be, Mg and Sr, wherein the mayenite-type compound has an atom number ratio represented by M/(Ca+M) of from 0.01 to 0.50, and at least a part of free oxygen ions in a mayenite-type crystal structure are substituted by anions of an atom having electron affinity smaller than that of an oxygen atom, and electrons.

(8) The mayenite-type compound according to (7), wherein a composition before the free oxygen ions are substituted by the anions is represented by $(Ca_{1-X}M_X)_{12}Al_{14}O_{33}$ (X is from 0.01 to 0.50).

(9) The mayenite-type compound according to (7) or (8), wherein the anion is at least one selected from the group consisting of $H^-$, $H^{2-}$, $F^-$, $Cl^-$, $Br^-$, $I^-$, $S^{2-}$ and $Au^-$.

(10) The mayenite-type compound according to any one of (7) to (9), wherein the atom M is Mg.

(11) The mayenite-type compound according to any one of (7) to (10), wherein the mayenite-type compound has an electron concentration of $1.0 \times 10^{17}/cm^3$ or more.

(12) A process for producing a mayenite-type compound, the process comprising:

a calcination step comprising mixing a calcium compound, an M-containing compound and an aluminum compound in such a manner that a molar ratio in terms of CaO, MO (M is at least one selected from the group consisting of Be, Mg and Sr) and $Al_2O_3$ becomes substantially $CaO:MO:Al_2O_3=12(1-Y):12Y:7$ (Y is from 0.01 to 0.90), and firing the resulting mixture at 900 to 1,300° C. in air, followed by pulverizing to obtain a calcined powder;

a reduction step comprising subjecting the calcined powder to a reducing treatment at a temperature of 850° C. to less than 1,415° C. to obtain a reduced product having a mayenite-type structure, in which at least a part of free oxygen ions of the calcined powder are substituted by electrons;

a substitution step comprising treating the reduced product at 400 to 1,200° C. in an atmosphere containing an atom having electron affinity smaller than that of an oxygen atom; and an irradiation step comprising irradiating any one of an ultraviolet ray having a wavelength of 140 to 380 nm, an electron beam and plasma.

Advantage of the Invention

According to the invention, there can be provided a mayenite-type compound which is chemically stable and excellent in oxidation resistance, and in which specific anions are not decreased easily even when heat treatment is conducted in air and electrons generated by irradiating the specific anions with an ultraviolet ray are also not decreased easily. Further, a process for producing such a mayenite-type compound at high productivity can be provided.

MODE FOR CARRYING OUT THE INVENTION

The invention will be described.

First, the mayenite-type compound of the invention will be described.

In the invention, the substitution indicates a state in which a part of Ca and Al of the mayenite-type compound are substituted by other atoms M. For example, in $(Ca_{1-X}M_X)_{12}Al_{14}O_{33}$ (X is from 0.01 to 0.50), a part of a Ca site is substituted by Mg in an amount of X. Further, the addition amount indicates the amount at the time of compounding raw materials for a calcium compound, an aluminum compound and a compound containing atom M to be added, at a desired stoichiometric ratio, when the mayenite-type compound is synthesized. For example, in $CaO:MgO:Al_2O_3=12(1-Y):12Y:7$ (Y is from 0.01 to 0.90), the amount of magnesium oxide at the time of compounding the raw materials is Y. All the amount Y of the M-containing compound added is not always substituted by a cation site of the mayenite-type compound, so that the substitution amount X and the addition amount Y are different from each other in some cases.

Accordingly, the substitution amount X was determined in the following manner. In the case where M is, for example, Mg in the invention, when the mayenite-type compound is synthesized, the mayenite-type compound is obtained appropriately in a single phase up to an addition amount Y of 0.01 to 0.30, at a level detectable by X-ray diffraction analysis. It is therefore considered that very few different phases except for the mayenite-type compound are present. Accordingly, it is considered that the addition amount Y is equal to the substitution amount X, when Y is within the range of 0.01 to 0.30.

On the other hand, when Y exceeds 0.30, Mg-containing different phases other than the mayenite-type compound are deposited. Accordingly, all the addition amount Y is not always substituted. That is to say, when Y exceeds 0.30, the addition amount Y does not become equal to the substitution amount X. For this reason, the lattice constant was measured in the following manner, and a calibration curve was prepared for the lattice constant and the substitution amount X of Mg. Using this calibration curve, the substitution amount X of Mg was calculated.

When the lattice constant at the time when Y is from 0 to 0.30 is measured, the lattice constant increases in proportion to the addition amount Y. The lattice constant was determined by an internal standard method of X-ray diffraction. For an internal standard, 50 parts by mass of $TiO_2$ was mixed based on 100 parts by mass of a sample to be measured, and the lattice constant was determined by extrapolation. The lattice constant "a" can be calculated from 2θ of a known peak of the mayenite-type compound. A calculation method is as follows. Mayenite is a cubic crystal, so that there is a relationship of equation 1 shown below, taking the interplanar spacing of the crystal as "d".

$$1/d^2 = 1/a^2 \times (h^2 + k^2 + l^2) \qquad \text{equation 1}$$

wherein h, k and l represent mirror indexes of a diffraction line.

Further, equation 2 shown below holds from Bragg's condition.

$$2 \times d \times \sin\theta = \lambda \qquad \text{equation 2}$$

wherein λ is a wavelength of an X-ray and a known value. The interplanar spacing d is calculated from 2θ determined from precise measurement of X-ray diffraction, and the lattice constant "a" can be calculated by using the known diffraction line (h, k and l).

Using the lattice constant thus obtained, the calibration curve of the lattice constant and the substitution amount X of Mg can be prepared, when Y is within the range of 0 to 0.30. Then, using this calibration curve, the substitution amount X of Mg can be calculated from the lattice constant.

Also for Be or Sr which is M other than Mg, the substitution amount X can be similarly determined.

The mayenite-type compound of the invention is a mayenite-type compound in which a part of Ca of a mayenite-type compound containing Ca, Al and oxygen is substituted by M (M represents at least one kind of atom selected from the group consisting of Be, Mg and Sr), and a mayenite-type compound in which the atom number ratio represented by M/(Ca+M) is from 0.01 to 0.50 and at least a part of free oxygen ions in a mayenite-type crystal structure are substituted by anions of an atom having electron affinity smaller than that of an oxygen atom (hereinafter also referred to as the "mayenite-type compound α of the invention") or a mayenite-type compound in which at least a part of free oxygen ions are substituted by the above-mentioned anions and electrons (hereinafter also referred to as the "mayenite-type compound β (3 of the invention").

The "mayenite-type compound of the invention" described below is understood to mean both the "mayenite-type compound α of the invention" and the "mayenite-type compound β of the invention".

The mayenite-type compound of the invention has a crystal structure equivalent to that of C12A7, and a part of Ca constituting the cages of C12A7 is substituted by at least one kind of atom (M) selected from the group consisting of Be, Mg and Sr. In the composition of C12A7, Ca may be substituted by two or more of Be, Mg and Sr. That is to say, it may have a composition such as $Ca_9Mg_2SrAl_{14}O_{33}$.

Of such ones, preferred is one in which a part of Ca in C12A7 is substituted by Mg, and more preferred is one in which it is substituted only by Mg, because the oxidation resistance of the mayenite-type compound α of the invention becomes higher.

Further, the mayenite-type compound of the invention is one in which Ca is substituted by M in a specific amount. Specifically, when represented by the atom number ratio, Ca is substituted by M within the range of M/(Ca+M)=0.01 to 0.50. M/(Ca+M)=0.20 to 0.45 is preferably, and M/(Ca+M)= 0.25 to 0.45 is more preferred. In a preferred standard herein, the electron concentration after heat treatment described later is within the range of $4.0 \times 10^{17}/cm^3$ or more, and in a more preferred standard, it is within the range of $1.0 \times 10^{18}/cm^3$. This is because when the electron concentration after heat treatment is $4.0 \times 10^{17}/cm^3$ or more, the high secondary electron emission coefficient can be maintained.

Furthermore, as described later, the mayenite-type compound of the invention is one in which at least a part of free oxygen ions are substituted by the specific anions, and preferably one in which the composition before substituted is represented by $(Ca_{1-X}M_X)_{12}Al_{14}O_{33}$ (X is from 0.01 to 0.50, preferably from 0.20 to 0.45, and more preferably from 0.25 to 0.45).

The mayenite-type compound α of the invention in which Ca is substituted by M within such a range has oxidation resistance and has a performance that the above-mentioned anions are not decreased easily even when heat treatment is conducted in air.

Accordingly, the mayenite-type compound β of the invention which is one after the mayenite-type compound α of the invention has been heat treated and further irradiated with an ultraviolet ray or the like contains many electrons and has the high secondary electron emission coefficient. When the value of the above-mentioned M/(Ca+M) or X is too large, it becomes difficult to retain the crystal structure of C12A7. In particular, when M is Mg, crystals of spinel $MgAl_2O_4$ and the like are deposited. The mayenite-type compound is also changed in crystal structure in some cases.

As described above, the mayenite-type compound of the invention is one in which a part of Ca constituting the cages of C12A7 is substituted by at least one kind of atom (M) selected from the group consisting of Be, Mg and Sr. However, Ca or Al not substituted may be further substituted by another atom. For example, a part of Ca may be substituted by Ba, and a part of Al may be substituted by Si, Ge, B, Ga or the like. Examples thereof include ones in which the compositions before substituted by the above-mentioned free oxygen ions are represented by $(Ca_{1-X}Mg_X)_{10}Sr_2Al_{14}O_{33}$, $(Ca_{1-X}Mg_X)_6Sr_6Al_{14}O_{33}$, $(Ca_{1-X}Mg_X)_{12}(Al_{1-Y}Ga_Y)_{14}O_{33}$ and $(Ca_{1-X}Mg_X)_{12}(Al_{1-Y}B_Y)_{14}O_{33}$.

As described above, the mayenite-type compound α of the invention has the crystal structure equivalent to that of C12A7. That is to say, it has 12 cages per unit lattice, and at least a part of free oxygen ions ($O^{2-}$) which are present in 2 cages thereof are substituted by anions described later. As described above, the composition before substituted by the above-mentioned anions and the composition of a part not substituted by the above-mentioned anions can be represented by $(Ca_{1-X}M_X)_{12}Al_{14}O_{33}$, and a part of substituted by the above-mentioned anions, for example, a moiety substituted by hydride ions ($H^-$), can be represented by $[(Ca_{1-X}M_X)_{12}Al_{14}O_{32}]^{2+}:2H^-$.

As described above, the mayenite-type compound α of the present invention in which at least a part of free oxygen ions are substituted by the anions of the atom having electron affinity smaller than that of the oxygen atom has oxidation resistance, and the above-mentioned anions are not decreased easily even when heat treated in air. Accordingly, the mayenite-type compound of the invention has a performance that electrons generated by irradiating the above-mentioned anions with an ultraviolet ray are not decreased easily. That is to say, when the mayenite-type compound α of the invention is heat treated in air, and then, irradiated with an ultraviolet ray, the mayenite-type compound β of the invention containing relatively many electrons and having a performance that the secondary electron emission coefficient is high is obtained. The mayenite-type compound has no oxidation resistance in the case of not having the above-mentioned anions. Further, it similarly has no oxidation resistance in the case where the free oxygen ions are substituted only by electrons and not substituted by the above-mentioned anions.

Further, herein, the electron affinity is energy necessary when an anion is generated from an atom, and is equal to work necessary for detaching an electron from the anion. In general, an enthalpy change in the course of forming an anion from an atom for any atom Z, namely in $Z \rightarrow Z^-$, is defined as electron affinity. As the electron affinity of oxygen in the invention, a value for a change in $O \rightarrow O^{2-}$ shall be considered to be used. Further, as the electron affinity of the atom in the invention, an enthalpy change in the course of not only $Z \rightarrow Z^-$ but also $Z \rightarrow Z^{2-}$ shall be considered to be contained. A comparison whether the electron affinity is large or small is more precise when the value in the cage of the mayenite-type compound is used. However, when the value in vacuum is used, existing data can be referred to. It is considered that there is no much difference between the value in the cage and the value in vacuum, so that the value in vacuum can be utilized.

Furthermore, herein, the anion of the atom having electron affinity smaller than that of the oxygen atom is preferably at least one selected from the group consisting of $H^-$, $H^{2-}$, $F^-$, $Cl^-$, $Br^-$, $I^-$, $S^{2-}$ and $Au^-$, and more preferably $H^-$. The reason for this is considerably that the anions of $H^-$, $H^{2-}$, $F^-$, $Cl^-$, $Br^-$, $I^-$, $S^{2-}$ and $Au^-$ easily donate the electrons in the cages, compared to the oxygen ion. When the mayenite-type compound α of the invention has many of these anions, the mayenite-type compound β of the invention after heating and ultraviolet irradiation increases in secondary electron emission coefficient to more improve electron emission characteristics. For example, when the free oxygen ions are ones substituted by the hydride ions ($H^-$), electrons are introduced into the cages in the course of $H^- \rightarrow H^0 + e^-$, and the secondary electron emission coefficient increases. Thus, the electron emission characteristics of the mayenite-type compound β of the invention are considered to be improved.

In addition, the amount of the above-mentioned anions of the mayenite-type compound α of the invention is not particularly limited. Usually, the anions remain in an amount of about 1 mol %, preferably 0.1 to 10 mol %, based on the remaining free oxygen ions.

The concentration of the anions of the atom having electron affinity smaller than that of the oxygen atom in the mayenite-type compound α of the invention can be determined by using a secondary ion mass spectrometry (SIMS). Further, above all, when the concentration of the hydride ions ($H^-$) is determined, it is desirable to previously determine the concentration of $OH^-$, for example, by measuring an infrared absorption spectrum (IR), in order to distinguish it from $OH^-$. The concentration of only $H^-$ can be precisely determined by subtracting the concentration of $OH^-$ determined by the IR from the total $H^-$ concentration determined by the SIMS.

Furthermore, as another method for determining the concentration of the anions of the atom having electron affinity smaller than that of the oxygen atom, it can be determined by using ESR. For example, a hydrogen atom $H^0$ generated by elimination of an electron from $H^-$ ($H^- \rightarrow H^0 + e^-$) can also be determined by using ESR.

In the case of making this measurement, it is desirable to adjust the sample temperature to 200 K or less.

In the mayenite-type compound α of the invention, the electron concentration after irradiated with an ultraviolet ray of 330 nm is preferably $1 \times 10^{17}/cm^3$ or more. That is to say, the electron concentration of the mayenite-type compound β of the invention is preferably $1 \times 10^{17}/cm^3$ or more, and more preferably $1 \times 10^{19}/cm^3$ or more. Incidentally, the maximum value of the electron concentration is $2.3 \times 10^{21}/cm^3$. Further, the electrical conductivity is preferably $1.0 \times 10^{-2}$ S/cm or more, more preferably 1.0 S/cm or more, and still more preferably 100 S/cm or more.

The electron concentration in the mayenite-type compound of the invention can be measured by using a diffuse reflection method. Further, it is also possible to measure the electron concentration in the cages by using electron spin resonance (ESR). Furthermore, in the mayenite-type compound in which the cages in which the free oxygen ions or $H^-$ is present and the cages in which the electrons are present coexist, light absorption occurs at 2.8 eV and 0.4 eV, so that the electron concentration can be obtained by measuring this absorption coefficient.

Although the reason why such a mayenite-type compound α of the invention has oxidation resistance is not clear, the present inventors presume as follows.

As one reason for this, the present inventors presume that localization of the anions such as the electrons or the hydride ions in the cages increases to decrease the rate of substitution with the oxygen ions, because the electronegativity of M is larger than that of Ca, resulting in improvement of oxidation resistance.

Further, the mayenite-type compound is a compound having high reducing property, so that the electrons are easily released from the cages at high temperature, for example, compared to the free oxygen ions. For this reason, when the mayenite-type compound including only the electrons is exposed to high temperature such as 500° C. in air, oxygen in air is changed to oxygen ions by the electrons donated from the cages, and an introducing reaction of the oxygen ions into the cages easily occurs. This is considered because a framework constituting the cages has a positive electric charge, so that the oxygen ions having a negative electric charge are introduced into the cages, but oxygen molecules or oxygen atoms which are electrically neutral are difficult to be introduced. Accordingly, the present inventors presume that compared to the mayenite-type compound including only the electrons, the mayenite-type compound α of the invention is small in electron-donating properties to inhibit a forming reaction of the oxygen ions from the oxygen molecules, which make it possible to slow the rate of introducing the oxygen ions into the cages.

The process for producing a mayenite-type compound of the invention will be described below.

The process for producing a mayenite-type compound α of the invention is not particularly limited. However, the mayenite-type compound α can be preferably produced by a process for producing a mayenite-type compound comprising: a calcination step of mixing a calcium compound, an M-containing compound and an aluminum compound in such a manner that the molar ratio in terms of CaO, MO and $Al_2O_3$ (M is at least one selected from the group consisting of Be, Mg and Sr) becomes substantially CaO:MO:$Al_2O_3$=12(1−Y):12Y:7 (Y is from 0.01 to 0.90), and firing the resulting mixture at 900 to 1,300° C. in air, followed by pulverizing to obtain a calcined powder; a reduction step of subjecting the above-mentioned calcined powder to a reducing treatment at a temperature of 850° C. to less than 1,415° C. to obtain a reduced product having a mayenite-type structure, in which at least a part of free oxygen ions of the above-mentioned calcined powder are substituted by electrons; and a substitution step of treating the above-mentioned reduced product at 400 to 1,200° C. in an atmosphere containing an atom having electron affinity smaller than that of an oxygen atom to obtain the above-mentioned mayenite-type compound α of the invention. Such a process is also referred to as the "production method α of the invention".

Further, in order to produce the mayenite-type compound β of the invention in which at least a part of free oxygen ions are substituted by the anions of the atom having electron affinity smaller than that of the oxygen atom and electrons, it can be produced by adding an irradiation step of further irradiating the mayenite-type compound α of the invention obtained after subjected to the above-mentioned substitution step, with any one of an ultraviolet ray having a wavelength of 140 to 380 nm, an electron beam and plasma. Such a process is also referred to as the "production method β of the invention" below. When described simply as the "production method of the invention" below, it is understood to mean both the "production method α of the invention" and the "production method β of the invention".

The production method α of the invention will be described in the order of the calcination step, the reduction step and the substitution step.

The calcination step in the production method α of the invention will be described.

In the calcination step, first, powders of the calcium compound, the M-containing compound and the aluminum compound are mixed to obtain the mixture. The mixed amounts (mixing ratio) of the calcium compound, the M-containing compound and the aluminum compound are adjusted herein in such a manner that the molar ratio in terms of CaO, MO and $Al_2O_3$ (M is at least one selected from the group consisting of Be, Mg and Sr) becomes substantially $CaO:MO:Al_2O_3=12(1-Y):12Y:7$. The term "adjusted in such a manner that the molar ratio becomes substantially $CaO:MO:Al_2O_3=12(1-Y):12Y:7$" used herein means that the molar ratio of the total amount of CaO and MO to $Al_2O_3$ is within the range of 11.4:7.6 to 12.6:6.4.

Here, Y is from 0.01 to 0.90, preferably from 0.2 to 0.80, and more preferably from 0.25 to 0.50, because the mayenite-type structure can be efficiently formed within such a range. When Y exceeds 0.9, for example, MgO remains without being solid-dissolved in the C12A7 crystal, and there is a tendency to form spinel $MgAl_2O_4$ or a composite oxide of calcium, aluminum and magnesium. Accordingly, when Y exceeds 0.9, it becomes difficult to form the mayenite-type compound by a solid phase reaction. When Y is less than 0.01, heat resistance cannot be sufficiently improved.

Further, examples of the calcium compounds used herein include CaO, $CaCO_3$ and $Ca(OH)_2$. Still further, examples of the M-containing compounds include BeO, MgO, SrO, $Mg(OH)_2$, $MgCO_3$ and $SrCO_3$. Furthermore, examples of the aluminum compounds include $Al_2O_3$ and $Al(OH)_3$.

In addition, a method for mixing the calcium compound, the M-containing compound and the aluminum compound is not particularly limited. For example, mixing can be performed by using a conventionally known mixer such as a ball mill.

In the case of mixing, another one may be further added, in addition to the calcium compound, the M-containing compound and the aluminum compound, followed by mixing. For example, water, a dispersing agent or an organic solvent such as alcohol may be added, followed by mixing. In the case of so-called wet mixing in which mixing is performed in a liquid, the liquid is volatilized by drying to obtain a mixture. Further, the mixture may be pulverized to form the above-mentioned powdery mixture.

Then, in the calcination step, the resulting mixture is fired at 900 to 1,300° C. in air.

The higher this temperature is, the more an element diffusion reaction associated with sintering proceeds. Homogeneity is improved thereby, so that this is preferred. On the other hand, when the temperature is too high, sintering is promoted to cause poor pulverizability. This is therefore unfavorable. Accordingly, this temperature is preferably from 1,000 to 1,250° C., and more preferably from 1,000 to 1,100° C.

The time for which the mixture is kept at such a temperature is not particularly limited. However, it is preferably from 1 to 6 hours, and more preferably from 1.5 to 4 hours.

After firing, the mixture is cooled and pulverized. A pulverizing method is not particularly limited. For example, mixing can be performed by using a conventionally known mixer such as a ball mill.

A powder obtained by such pulverization is called the calcined powder. The calcined powder is considered to be the composite oxide of calcium, M and aluminum and/or in a mixed crystal state of CaO, MO (BeO, MgO, SrO) and $Al_2O_3$.

The reduction step in the production method α of the invention will be described below.

The reduction step is a step of subjecting the above-mentioned calcined powder to the reducing treatment at a temperature of 850° C. to less than 1,415° C. (this temperature is also referred to as the "reduction temperature"). The reduced product having the mayenite-type structure, in which at least a part of free oxygen ions of the above-mentioned calcined powder are substituted by electrons, can be obtained by this step. When the reduction temperature is less than 850° C., the mayenite-type compound is not synthesized. It is therefore necessary to be 850° C. or more.

A method for reducing the calcined powder is not particularly limited.

For example, using an electric furnace of a closed system in which the oxygen partial pressure is adjusted to about 10 Pa or less by allowing a $N_2$ gas with partial pressures of oxygen and water vapor reduced to flow in an atmosphere thereof, the above-mentioned calcined powder is disposed in the inside thereof, and the atmosphere temperature is adjusted to a temperature (reduction temperature) of 850° C. to less than 1,415° C., followed by firing, thereby being able to perform the reducing treatment. This reduction temperature is preferably 1,370° C. or less, more preferably 1,360° C. or less, and still more preferably 1,350° C. or less.

Further, the reduction temperature is preferably 1,280° C. or more, more preferably 1,300° C. or more, and still more preferably 1,320° C. or more. In addition to the $N_2$ gas, various inert gases containing no oxygen gas, for example, atmospheres of a nitrogen gas or rare gases such as an argon gas, vacuums and the like are preferably exemplified.

Furthermore, for example, one obtained by adding a carbon powder or the like to the above-mentioned calcined powder obtained in the above-mentioned calcination step, followed by mixing may be exposed to an atmosphere having a temperature of 850° C. to less than 1,415° C. When the above-mentioned calcined powder is reduced in a carbon crucible, or when the carbon powder is mixed with the calcined powder, followed by reduction, the reduction temperature is preferably 1,200° C. or more.

From the viewpoint of intending to efficiently produce the mayenite-type compound of the invention, the reduction temperature is preferably from 1,280° C. to 1,400° C., because when the temperature is less than 1,280° C., calcium aluminates having CA crystals ($CaAl_2O_4$ crystals), C3A crystals ($Ca_3Al_2O_6$ crystals), C5A3 crystals ($Ca_5Al_6O_{14}$ crystals) and the like having no cage structure other than the mayenite-type compound are produced in large amounts in some cases. Further, this is because, when the reduction temperature becomes a temperature close to 1,415° C., the calcined powder might be melted. When the powder is melt adhered to the carbon vessel, it becomes difficult to collect it, resulting in poor productivity.

Further, the soaking time at the reduction temperature is not particularly limited. However, when 3 g of the sample is used, it is preferably from 1 to 6 hours, and more preferably from 1.5 to 3 hours.

Furthermore, the rate of temperature increase from about room temperature until the temperature reaches the reduction temperature is preferably 50° C./hour or more, and more preferably 200° C./hour or more, because when the rate of temperature increase is less than 50° C./hour, a long period of time is required for heat treatment, resulting in a decrease in productivity.

In addition, the temperature decrease from the reduction temperature is preferably rapid cooling, because the electron concentration of the resulting mayenite-type compound tends to increase. This is because in the case of slow cooling, the reduction ability of C12A7 becomes higher than that of carbon at 1,000° C. or less, so that C12A7 might be oxidized with carbon. For this reason, when the mayenite-type compound having an electron concentration of $5.0 \times 10^{20}$ cm$^{-3}$ or more is prepared, the cooling rate is preferably from 100 to 700° C./min.

By such a reduction step, there can be obtained the reduced product having the mayenite-type structure, in which at least a part of free oxygen ions of the above-mentioned calcined powder are substituted by electrons.

All of the free oxygen ions may be substituted by electrons. However, usually, in the case of the above-mentioned reduction treatment with carbon, about 1 mol % of the free oxygen ions are substituted by electrons, and the other free oxygen ions remain as they are.

The substitution step in the production method a of the invention will be described below.

The substitution step is a step of treating the above-mentioned reduced product at 400 to 1,200° C. in the atmosphere containing the atom having electron affinity smaller than that of the oxygen atom to obtain the above-mentioned mayenite-type compound α of the invention.

For example, the above-mentioned reduced product is treated at 400 to 1,200° C. in an atmosphere containing hydrogen, thereby being able to substitute at least a part of the electrons or the free oxygen ions of the above-mentioned reduced product by H$^-$. Also when substituted by the anions of the atom having electron affinity smaller than that of an oxygen atom, other than H$^-$, substitution can be similarly performed. It is preferred that the atmosphere containing hydrogen has a moisture content of 100 ppm or less.

In the case of substitution with H$^-$, when the partial pressure of the hydrogen gas is from $1.0 \times 10^4$ to $1.1 \times 10^5$ Pa, sufficient H$^-$ concentration is preferably obtained. For example, a mixed gas of the hydrogen gas and the nitrogen gas is allowed to flow in an electric furnace provided with an alumina core tube, and the hydrogen gas concentration is adjusted to 20% by volume, thereby being able to obtain the above-mentioned hydrogen gas partial pressure. The hydrogen gas concentration is preferably from 4 to 75% by volume. Then, the hydrogen gas atmosphere temperature is adjusted to 400 to 1,200° C., and the treatment is conducted. The hydrogen gas atmosphere temperature is preferably from 500 to 1,100° C., because the electrons or the free oxygen ions of the above-mentioned reduced product can be easily substituted by H$^-$ within this temperature range.

The mayenite-type compound α of the invention can be produced by such a production method α of the invention.

The mayenite-type compound α of the invention can also be produced by other methods.

For example, methods for obtaining the mayenite-type compound of the invention in which the free oxygen ions are substituted by Cl$^-$ or F$^-$ include the following method.

A raw material obtained by compounding and mixing CaCO$_3$ and Al$_2$O$_3$ so as to provide CaO/Al$_2$O$_3$=11:7 (molar ratio) is heat treated up to 1,100 to 1,350° C. in air to obtain a fired product (hereinafter also referred to as "C11A7"). Then, this fired product and CaCl$_2$ are mixed so as to provide a molar ratio of Ca and Al of 12:7, and this mixture (C11A7.CaCl$_2$) is kept at 900 to 1,300° C. in air, thereby being able to obtain the mayenite-type compound ([Ca$_{12}$Al$_{14}$O$_{32}$]$^{2+}$.2Cl$^-$) in which Cl$^-$ has been introduced into the cages.

Further, C11A17 and CaF$_2$ are mixed so as to provide a molar ratio of Ca and Al of 12:7, and then, this mixture (C11A7.CaF$_2$) is kept at 900 to 1,300° C. in air. By doing so, the mayenite-type compound ([Ca$_{12}$Al$_{14}$O$_{32}$]$^{2+}$.2F$^-$) in which F$^-$ has been introduced into the cages can be obtained.

The mayenite-type compound α of the invention produced by the production method α or the other method as described above is further subjected to the irradiation step, thereby being able to produce the mayenite-type compound β of the invention.

In addition to the production method α of the invention, the production method β of the invention further having the irradiation step will be described.

The irradiation step will be described.

The irradiation step which the production method β of the invention has is a step of further irradiating the mayenite-type compound α of the invention with any one of an ultraviolet ray having a wavelength of 140 to 380 nm, an electron beam and plasma.

The irradiation step is not particularly limited as long as it is a step in which the mayenite-type compound α of the invention can be irradiated with any one of an ultraviolet ray having a wavelength of 140 to 380 nm, an electron beam and plasma. For example, conventionally known methods can be applied.

For example, in the case where the anions of the atom having electron affinity smaller than that of the oxygen atom are H$^-$, when the ultraviolet ray of 140 to 380 nm is irradiated to the mayenite-type compound α of the invention, electrons eliminated from H$^-$ are introduced into the cages, and the mayenite-type compound β of the invention having an electron concentration of $1 \times 10^{17}$/cm$^3$ or more, in which the cages in which the free oxygen ions or H$^-$ is present and the cages in which the electrons are present coexist, can be relatively easily obtained.

Further, by irradiating the electron beam to the mayenite-type compound α of the invention in which a part of the free oxygen ions are substituted by H$^-$, electrons are introduced into the cages, and the mayenite-type compound β of the invention having an electron concentration of $1 \times 10^{17}$/cm$^3$ or more, in which the cages in which the free oxygen ions or H$^-$ is present and the cages in which the electrons are present coexist, can be relatively easily obtained.

Furthermore, by keeping in plasma the mayenite-type compound α of the invention in which a part of the free oxygen ions are substituted by H$^-$, the conductive mayenite-type compound (the mayenite-type compound β of the invention) in which the cages in which the free oxygen ions or H$^-$ is present and the cages in which the electrons are present coexist can be relatively easily obtained.

EXAMPLES

The invention will be specifically described by examples below, but the invention is not limited to the following description.

Example 1

Powdery calcium carbonate (CaCO$_3$), magnesium oxide (MgO) and aluminum oxide (Al$_2$O$_3$) were mixed so as to provide a molar ratio of 11.1:0.9:7 (=12(1−0.075):12×0.075:7) (addition amount Y=0.075). Further, ion-exchanged water and a dispersing agent (trade name: BYK 180, manufactured by BYK-Chemie GmbH) were further added herein, in addition to calcium carbonate, magnesium oxide and aluminum oxide, followed by mixing. For the addition amount herein, when the total of calcium carbonate, magnesium oxide and aluminum oxide was taken as 100 parts by mass, ion-exchanged water was 100 parts by mass, and the dispersing agent was 0.30 part by mass. A ball mill was used for mixing, and mixing was performed for 3 hours.

Then, the resulting mixed powder was kept in a dryer (100° C.) for 6 hours to dry it.

Next, the mixed powder after drying was placed in an alumina crucible, and calcined in an air atmosphere. After the temperature was raised to 1,100° C. at a rate of temperature increase of 300° C./hour herein, it was kept for 2 hours to conduct a solid phase reaction, and slow cooling was performed at a cooling rate of 300° C./hour to obtain calcined powder A1 as a white crystalline body.

For calcined powder A1 obtained herein, an X-ray diffraction pattern was measured by using an X-ray diffractometer. The measurement was made under measuring conditions of 200 mA and 50 V with irradiation of a Kα ray. As a result, an X-ray peak at 2θ=18.1° characteristic to the mayenite-type compound did not appear from the X-ray diffraction pattern of calcined powder A1. Accordingly, this revealed that only a composite oxide of calcium, aluminum and magnesium and CaO, $Al_2O_3$ and MgO were present in calcined powder A1.

Then, calcined powder A1 was pulverized, and 3 g thereof was placed in a covered carbon vessel having a diameter of 50 mm, an inside diameter of 40 mm and a height of 50 mm. This vessel was placed in a nitrogen atmosphere electric furnace having an oxygen concentration of 1% by volume or less, and heated to 1,350° C. at a rate of temperature increase of 20° C./minute. Then, after kept in that state for 2 hours, this was cooled to room temperature. The average of the cooling rate was 20° C./minute herein.

When the cover was opened after the carbon vessel reached to room temperature, the resulting reduced product showed a deep green color. The resulting reduced product was named sample B1. Sample B1 was pulverized, and a signal was measured by ESR (electron spin resonance, JES-TE200 manufactured by JEOL Ltd.). As a standard sample, copper sulfate was measured at the same time. From the intensity ratio of the signals, the electron concentration was estimated. The electron concentration was found to be $1.5 \times 10^{19}/cm^3$.

Then, sample B1 was heated to 1,000° C. at a rate of temperature increase of 30° C./minutes in a hydrogen atmosphere having a hydrogen partial pressure of $1.0 \times 10^5$ Pa. After kept in that state for 30 minutes, the sample was cooled to room temperature. The average of the cooling rate was 330° C./minute. A sample (mayenite-type compound) obtained after reached to room temperature showed a pale grey color. The resulting sample was named sample C1.

Next, sample C1 was pulverized to form a powder having an average particle size of 20 μm. The average particle size was measured by a laser diffraction scattering method (SALD-2100, Shimadzu Corporation). Heat resistance largely depends on the particle size of a sample. Accordingly, in all the following Examples and Comparative Examples, sample C was a powder having an average particle size of 20 μm. When this powder was irradiated with an ultraviolet ray of 330 nm, it showed a green color. The reason for this is considered that a reaction of $H^- \rightarrow H^0 + e^-$ proceeded, whereby electrons eliminated from $H^-$ were introduced into the cages. This sample was named sample D1. From an ESR signal thereof, sample D1 was found to have an electron concentration of $9.5 \times 10^{18}/cm^3$.

Further, C1 was pulverized to an average particle size of 20 μm, and heated at 500° C. for 10 minutes in an air atmosphere by using an infrared heating furnace. The rate of temperature increase was 250° C./hour, and the cooling rate was 300° C./hour. The resulting sample was named sample E1.

Then, sample E1 was pulverized, and irradiated with an ultraviolet ray of 330 nm. Thereupon, it showed a green color. The reason for this is considered that a reaction of $H^- \rightarrow H^0 + e^-$ proceeded, whereby electrons eliminated from $H^-$ were introduced into the cages. This sample was named sample F1. From an ESR signal thereof, sample F1 was found to have an electron concentration of $3.3 \times 10^{17}/cm^3$. The ratio of sample D1 before the heat treatment and sample F1 after the heat treatment in electron concentration was 0.03. That is to say, it was found to have such high oxidation resistance characteristics that 3% of the electrons remain even by the heat treatment.

Further, from X-ray diffraction analysis, X-ray diffraction patterns of samples B1, C1, D1, E1 and F1 almost agreed with one another, so that the mayenite-type compound was found to be present. Furthermore, no different phase was present. Accordingly, it was found that when the addition amount Y was 0.075, the addition amount Y was equal to the substitution amount X.

Example 2

Calcined powder A2 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 10.2:1.8:7 (=12(1−0.15):12×0.15:7) (addition amount Y=0.15). Then, from calcined powder A2, samples B2 to F2 were obtained in the same manner as in Example 1.

Samples D2 and F2 were found to have electron concentrations of $9.8 \times 10^{18}/cm^3$ and $3.9 \times 10^{17}/cm^3$, respectively, from ESR signals thereof. The ratio of sample D2 as a sample before the heat treatment and sample F2 as a sample after the heat treatment in electron concentration was 0.04. That is to say, it was found to have such high oxidation resistance characteristics that 4% of the electrons remain even by the heat treatment.

Example 3

Calcined powder A3 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 9.3:2.7:7 (=12(1−0.22):12×0.22:7) (addition amount Y=0.22). Then, from calcined powder A3, samples B3 to F3 were obtained in the same manner as in Example 1.

Samples D3 and F3 were found to have electron concentrations of $1.0 \times 10^{19}/cm^3$ and $4.3 \times 10^{17}/cm^3$, respectively, from ESR signals thereof. The ratio of sample D3 as a sample before the heat treatment and sample F3 as a sample after the heat treatment in electron concentration was 0.04. That is to say, it was found to have such high oxidation resistance characteristics that 4% of the electrons remain even by the heat treatment.

Example 4

Calcined powder A4 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 8.4:3.6:7 (=12(1−0.30):12×0.30:7) (addition amount Y=0.30). Then, from calcined powder A4, samples B4 to F4 were obtained in the same manner as in Example 1.

Samples D4 and F4 were found to have electron concentrations of $1.2\times10^{19}/cm^3$ and $2.5\times10^{18}/cm^3$, respectively, from ESR signals thereof. The ratio of sample D4 as a sample before the heat treatment and sample F4 as a sample after the heat treatment in electron concentration was 0.21. That is to say, it was found to have such high oxidation resistance characteristics that 21% of the electrons remain even by the heat treatment.

Example 5

Calcined powder A5 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 7.2:4.8:7 (=12(1−0.40):12×0.40:7) (addition amount Y=0.40). Then, from calcined powder A5, samples B5 to F5 were obtained in the same manner as in Example 1. Samples D5 and F5 were found to have electron concentrations of $6.7\times10^{18}/cm^3$ and $2.9\times10^{18}/cm^3$, respectively, from ESR signals thereof. The ratio of sample D5 as a sample before the heat treatment and sample F5 as a sample after the heat treatment in electron concentration was 0.43. That is to say, it was found to have such high oxidation resistance characteristics that 43% of the electrons remain even by the heat treatment. When samples B5, C5, D5, E5 and F5 were analyzed by X-ray diffraction, different phases were deposited. Accordingly, the substitution amount X was determined from a calibration curve.

The lattice constant of the mayenite-type compound in the case of preparing the calibration curve was determined from a second peak in the vicinity of 2θ=33.3°. In general, in order to increase the measurement accuracy of the lattice constant, 2θ on the high-angle side is used. However, when the addition amount Y exceeds 0.30, different phases represented by $MgAl_2O_4$ are deposited, and a peak of the mayenite-type compound significantly decreases with an increase in the addition amount Y. For this reason, in a peak on the high-angle side, the intensity is small. When Y increases, it becomes difficult to measure 2θ. Accordingly, the calibration curve is prepared from the second peak. The calibration curve was prepared as described below.

The lattice constants at the time when the amounts added Y were 0, 0.075, 0.15, 0.225 and 0.30 were determined from the second peaks of the mayenite-type compounds. The different phase is scarcely deposited within the range of Y of 0 to 0.30, so that the addition amount Y=the substitution amount X was used. When the lattice constant was plotted on the x-axis and the substitution amount X on the y-axis, an appropriately linear proportional relationship was obtained. Then, an equation in which the relationship between the lattice constant and the substitution amount X was linear approximated was prepared, and using this as the calibration curve, it was made possible to determine the substitution amount X from the lattice constant in the range of Y exceeding 0.30. The substitution amount X calculated from this calibration curve was 0.38.

Example 6

Calcined powder A6 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 4.8:7.2:7 (=12(1−0.60):12×0.60:7) (addition amount Y=0.60). Then, from calcined powder A6, samples B6 to F6 were obtained in the same manner as in Example 1. Samples D6 and F6 were found to have electron concentrations of $4.6\times10^{18}/cm^3$ and $2.4\times10^{17}/cm^3$, respectively, from ESR signals thereof. The ratio of sample D6 as a sample before the heat treatment and sample F6 as a sample after the heat treatment in electron concentration was 0.05. That is to say, it was found to have such high oxidation resistance characteristics that 5% of the electrons remain even by the heat treatment. When samples B6, C6, D6, E6 and F6 were analyzed by X-ray diffraction, different phases were deposited. Accordingly, the substitution amount X was determined from the calibration curve determined in Example 5. The substitution amount X calculated from this calibration curve was 0.17.

Example 7

Calcined powder A7 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 2.4:9.6:7 (=12(1−0.80):12×0.80:7) (addition amount Y=0.80). Then, from calcined powder A7, samples B7 to F7 were obtained in the same manner as in Example 1. Samples D7 and F7 were found to have electron concentrations of $2.7\times10^{18}/cm^3$ and $1.8\times10^{17}/cm^3$, respectively, from ESR signals thereof. The ratio of sample D7 as a sample before the heat treatment and sample F7 as a sample after the heat treatment in electron concentration was 0.07. That is to say, it was found to have such high oxidation resistance characteristics that 7% of the electrons remain even by the heat treatment. When samples B7, C7, D7, E7 and F7 were analyzed by X-ray diffraction, different phases were deposited. Accordingly, the substitution amount X was determined from the calibration curve determined in Example 5. The substitution amount X calculated from this calibration curve was 0.09.

Comparative Example 1

Calcined powder A01 was obtained in the same manner as in Example 1 with the exception that the molar ratio of Mg X was made 0.

From an X-ray diffraction pattern, the resulting calcined powder A01 was found to be composed of a composite oxide of calcium, aluminum and magnesium, and CaO, $Al_2O_3$ and MgO.

Further, from an ESR signal of a sample (sample B01) obtained by subjecting calcined powder A01 to a reduction treatment in a covered carbon vessel, the electron concentration was found to be $1.8\times10^{19}/cm^3$.

Still further, a sample obtained by treating sample B01 in a hydrogen atmosphere was named sample C01.

Furthermore, from an ESR signal of a sample (sample D01) obtained by irradiating sample C01 with an ultraviolet ray, the electron concentration was found to be $1.5\times10^{19}/cm^3$.

In addition, sample C01 pulverized to an average particle size of 20 μm was treated by using an infrared heating furnace to obtain a sample (sample E01), which was white crystals. From an ESR signal of a sample (F01) obtained by ultraviolet irradiation to sample E01, the electron concentration was lower than $1.0\times10^{14}/cm^3$ as a measurement limit. The electron concentration was $10^{-5}$ times or less that before the heat treatment, and oxidation resistance characteristics were extremely low.

Comparative Example 2

Calcined powder A02 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 0.6:11.4:7 (=12(1−0.95):12×0.95:7) (addition amount Y=0.95). Then, from calcined powder A02, samples B02 to F02 were obtained in the same manner as in Example 1.

Samples D02 and F02 were found to have electron concentrations of $9.0 \times 10^{17}/cm^3$ and $8.0 \times 10^{15}/cm^3$, respectively, from ESR signals thereof. The electron concentration was 0.9% of that before the heat treatment, and oxidation resistance characteristics were extremely low. When samples B02, C02, D02, E02 and F02 were analyzed by X-ray diffraction, different phases were deposited. Accordingly, the substitution amount X was determined from the calibration curve determined in Example 5. The substitution amount X calculated from the calibration curve was 0.004.

Comparative Example 3

Calcined powder A03 as a white crystalline body was obtained in the same manner as in Example 1 with the exception that powdery calcium carbonate ($CaCO_3$), magnesium oxide (MgO) and aluminum oxide ($Al_2O_3$) were mixed so as to provide a molar ratio of 0:12:7 (=12(1−1):12×1:7). Then, from calcined powder A03, samples B03 was obtained in the same manner as in Example 1. Sample B03 was white, and it was found that no mayenite structure was present therein.

The results of the electron concentrations in the respective Examples and Comparative Examples are summarized in the following Table 1.

it can be used as an electrode material requiring high-temperature heat treatment, such as a PDP protective film or a charge-injection material in organic EL devices.

The invention claimed is:

1. A mayenite compound in which a part of Ca of a mayenite compound containing Ca, Al and oxygen is substituted by an atom M, wherein M is Mg;
   wherein said mayenite compound has an atom number ratio represented by M/(Ca+M) of from 0.2 to 0.45, and at least a part of free oxygen ions in a mayenite crystal structure are substituted by anions of an atom having electron affinity smaller than that of an oxygen atom.

2. The mayenite compound according to claim 1, wherein a composition before the free oxygen ions are substituted by the anions is represented by $(Ca_{1-x}M_x)_{12}Al_{14}O_{33}$ wherein x is from 0.2 to 0.45.

3. The mayenite compound according to claim 1, wherein the anion is at least one selected from the group consisting of $H^-$, $H^{2-}$, $F^-$, $Cl^-$, $Br^-$, $I^-$, $S^{2-}$ and $Au^-$.

4. The mayenite compound of claim 1, wherein M/(Ca+M) is from 0.25 to 0.45.

5. The mayenite compound according to claim 1, wherein the mayenite compound has an electron concentration of $1.0 \times 10^{17}/cm^3$ or more after irradiation with an ultraviolet ray of 330 nm.

6. A process for producing a mayenite compound as claimed in claim 1, said process comprising:
   a calcination step comprising mixing a calcium compound, an M-containing compound and an aluminum com-

TABLE 1

| | Ratio of Mg Added Y | Ratio of Mg Substituted X | Electron Concentration of Sample D [$10^{18}/cm^3$] | Electron Concentration of Sample F [$10^{17}/cm^3$] | Remaining Ratio of Number of Electrons after Heating at 500° C. for 10 minutes in Air Atmosphere (%) |
|---|---|---|---|---|---|
| Example 1 | 0.075 | 0.075 | 9.5 | 3.3 | 3.5 |
| Example 2 | 0.15 | 0.15 | 9.8 | 3.9 | 4.0 |
| Example 3 | 0.225 | 0.225 | 10 | 4.3 | 4.3 |
| Example 4 | 0.30 | 0.30 | 12 | 25 | 21 |
| Example 5 | 0.40 | 0.38 | 6.7 | 29 | 43 |
| Example 6 | 0.60 | 0.17 | 4.6 | 2.4 | 5.2 |
| Example 7 | 0.80 | 0.09 | 2.7 | 1.8 | 6.7 |
| Comparative Example 1 | 0 | 0 | 15 | 0.001 or less | 0.001 or less |
| Comparative Example 2 | 0.95 | 0.004 | 0.9 | 0.08 | 0.8 |
| Comparative Example 3 | 1.00 | — | Mayenite was not formed | — | — |

While the invention has been described in detail and with reference to specific embodiments thereof, it will be apparent to one skilled in the art that various changes and modifications can be made without departing from the spirit and scope of the invention.

The invention is based on Japanese Patent Application No. 2008-218199 filed on Aug. 27, 2008, and the contents of which are incorporated herein by reference.

INDUSTRIAL APPLICABILITY

According to the production method of the invention, there can be produced a bulk body or a powder of a mayenite-type compound in which a decrease in electron concentration can be inhibited even when heat treated in air.

The mayenite-type compound of the invention is a little decreased in electron concentration by heat treatment, so that pound in such a manner that a molar ratio in terms of CaO, MO wherein M is Mg and $Al_2O_3$ becomes substantially CaO:MO:$Al_2O_3$=12(1−Y):12Y:7 wherein Y is from 0.01 to 0.90, and firing the resulting mixture at 900 to 1,300° C. in air, followed by pulverizing to obtain a calcined powder;

a reduction step comprising subjecting the calcined powder to a reducing treatment at a temperature of 850° C. to less than 1,415° C. to obtain a reduced product having a mayenite structure, in which at least a part of free oxygen ions of the calcined powder are substituted by electrons; and a substitution step comprising treating the reduced product at 400 to 1,200° C. in an atmosphere containing an atom having electron affinity smaller than that of an oxygen atom.

7. A mayenite compound in which a part of Ca of a mayenite compound containing Ca, Al and oxygen is substituted by an atom M, wherein M is Mg;

wherein said mayenite compound has an atom number ratio represented by M/(Ca+M) of from 0.2 to 0.45, and at least a part of free oxygen ions in a mayenite crystal structure are substituted by anions of an atom having electron affinity smaller than that of an oxygen atom, and electrons.

8. The mayenite compound according to claim 7, wherein a composition before the free oxygen ions are substituted by the anions is represented by $(Ca_{1-x}M_x)_{12}Al_{14}O_{33}$ wherein x is from 0.2 to 0.45.

9. The mayenite compound according to claim 7, wherein the anion is at least one selected from the group consisting of $H^-$, $H^{2-}$, $F^-$, $Cl^-$, $Br^-$, $I^-$, $S^{2-}$ and $Au^-$.

10. The mayenite compound of claim 7, wherein M/(Ca+M) is from 0.25 to 0.45.

11. The mayenite compound according to claim 7, wherein the mayenite compound has an electron concentration of $1.0 \times 10^{17}/cm^3$ or more.

12. A process for producing a mayenite compound as claimed in claim 7, said process comprising:

a calcination step comprising mixing a calcium compound, an M-containing compound and an aluminum compound in such a manner that a molar ratio in terms of CaO, MO wherein M is Mg and $Al_2O_3$ becomes substantially $CaO:MO:Al_2O_3 = 12(1-Y):12Y:7$ wherein Y is from 0.01 to 0.90, and firing the resulting mixture at 900 to 1,300° C. in air, followed by pulverizing to obtain a calcined powder;

a reduction step comprising subjecting the calcined powder to a reducing treatment at a temperature of 850° C. to less than 1,415° C. to obtain a reduced product having a mayenite structure, in which at least a part of free oxygen ions of the calcined powder are substituted by electrons;

a substitution step comprising treating the reduced product at 400 to 1,200° C. in an atmosphere containing an atom having electron affinity smaller than that of an oxygen atom; and an irradiation step comprising irradiating the product of the substitution step with any one of an ultraviolet ray having a wavelength of 140 to 380 nm, an electron beam and plasma.

* * * * *